US006376636B1

(12) United States Patent
Hansma et al.

(10) Patent No.: US 6,376,636 B1
(45) Date of Patent: Apr. 23, 2002

(54) MODULAR, ENERGY-DISSIPATING MATERIAL AND METHOD FOR USING IT

(75) Inventors: Paul K. Hansma; Johannes Kindt, both of Goleta; Timothy J. Deming, Summerland; Daniel E. Morse, Santa Barbara; Galen D. Stucky, Goleta, all of CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 09/428,391

(22) Filed: Oct. 28, 1999

Related U.S. Application Data
(60) Provisional application No. 60/105,921, filed on Oct. 28, 1998.

(51) Int. Cl.⁷ .................. C08G 77/20; C08F 30/08; C08F 230/08
(52) U.S. Cl. .................. 528/32; 528/35; 526/160; 526/201; 526/279; 526/264; 526/242
(58) Field of Search .................. 526/201, 279, 526/264, 242, 127, 160, 161; 528/26, 27, 28, 29, 32, 35

(56) References Cited

U.S. PATENT DOCUMENTS

| | | | | |
|---|---|---|---|---|
| 4,981,903 A | * | 1/1991 | Garbe et al. | 524/547 |
| 5,804,099 A | * | 9/1998 | Heilen et al. | 252/358 |
| 6,075,103 A | * | 6/2000 | Marks et al. | 526/127 |

OTHER PUBLICATIONS

R. Giles et al., Mat.Res.Soc.Symp.Proc. vol. 332, *Imaging Single Nacreous Tablets with the Atomic Force Microscope,* p. 413 (1994).

J.P.Cleveland et al., Forces in Scanning Probe Methods, *Atomic Scale Force Mapping with the Atomic Force Microscope,* 543–549 (1995).
Manfred Radmacher et al., Langmuir, *Imaging Adhesion Forces and Elasticity of Lysozyme Adsorbed on Mica with the Atomic Force Microscope,* vol. 10 No. 10 3809–3814.
Nils Almqvist et al., Mat. Science & Eng., *Methods for fabricating and characterizing a new generation of biomimetic materials,* (1999) 37–43.
Manfred Radmacher, et. al. Biophysical Journal, *Measuring the Viscoelastic Properties of Human Platelets with the Atomic Force Microscope,* (1996) 556–567.
Manfred Racmacher, et al. International Society for Optical Engineering, SPIE vol. 2384, *Imaging adhesion forces on proteins with the atomic force microscope* (1995) 136–143.
Charlotte M. Zaremba, et al., Chem. Mater., *Critical Transitions in the biofabrication of Abalone Shells and Flat Pears,* vol. 8, No. 3,(1996) 679–690.
A. M. Belcher, et al., Acta Mater., *First Steps in Harnessing the Potential of Biomineralization as a Route to New–Performance Composite Materials,* vol. 46, No. 3 (1998) 733–736.
Matthias Rief, et al., Science, *Reversible Unfolding of Individual Titin Immunoglobulin Domains by AFM,* vol. 276 (1997) 1109–1112.

(List continued on next page.)

*Primary Examiner*—David W. Wu
*Assistant Examiner*—R. Harlan
(74) *Attorney, Agent, or Firm*—Fulbright & Jaworski L.L.P.

(57) ABSTRACT

Modular, energy-dissipating material prevents failure of adhesives, fibers and composite and other structures. The modules comprise folded subunits or domains that unfold in a stepped fashion at forces below that necessary to break the backbone of the material and, with adhesive material, below that necessary to break the bonds that fasten the material to surfaces being glued.

16 Claims, 6 Drawing Sheets

ASSOCIATING -- FLEXIBLE

OTHER PUBLICATIONS

Xueyu Shen, et al., J of Biological Chemistry, *Molecular Cloning and Characterization of Lustrin A, a Matrix Protein from Shell and Pearl Nacre of Haliotis rufescens*, vol. 272, No. 51 (1997) 32472–32481.

Mario Viani, et al., J.of Applied Physics, *Small Cantilevers for force spectroscopy of single molecules*, vol. 86 No. 4 2258–2262 (1999).

A. M. Belcer et al., Nature, *Control of crystal phase switching and orientation by soluble molluse–shell proteins*, vol. 381, 56–58 (1996).

Tilman E. Schäfer et al., Am. Chem. Society, *Does Abalone Nacre Form by Heteroepitaxial Nucleation or by Growth through Mineral Bridges?* (1997).

Deron A. Walters et al., Biophysical Journal, *Modification of Calcite Crystal Growth by Abalone Shell Proteins: An Atomic Force Microscope Study*, vol. 72 (1997) 1425–1433.

Charlotte M. Zaremba, et al., Chem. Mater.,*Argonite–Hydroxyapatite Conversion in Gastropod (Abalone) Nacre*, vol. 10, No. 12, (1998) 3813–3824.

\* cited by examiner

ASSOCIATING -- FLEXIBLE

MODULAR, ENERGY-DISSIPATING MATERIAL AND METHOD FOR USING IT

CROSS REFERENCE TO RELATED APPLICATIONS

This application claims the benefit of Provisional Patent Application No. 60/105,921, filed Oct. 28, 1998.

STATEMENT REGARDING FEDERALLY FUNDED RESEARCH

This invention was made with Government support under Grant No. DAAH04-96-1-004 awarded by the Army Research Office. The Government has certain rights in this invention.

BACKGROUND OF THE INVENTION

Adhesion can be defined as the state in which two surfaces are held together by interfacial forces which may consist of valence forces, molecular bonding, or mechanical, interlocking action. Failure of the adhesive can result from the bond between the adhesive and one or both substrates being insufficient to withstand force applied to the adhered substrates so that the adhesive strips away from one or both substrates. Cohesive failure of the adhesive can occur when the internal strength of the adhesive is not as great as the force applied to it. In such failure, the adhesive may remain bonded to both substrates. As an adhesive is subject to increasing force, its behavior depends on the elasticity of the adhesive.

Gluing materials together with conventional adhesives has traditionally involved either relatively stiff adhesives such as epoxies, or elastic adhesives such as silicon adhesives. As illustrated in the force vs. extension curves of FIG. 1, when pulling two surfaces glued together with a short molecule, the pulling force increases rapidly with only a little extension of the molecule. A perfect stiff adhesive would be a short molecule bound to each surface by strong (that is, covalent or ionic) bonds and the molecules of the adhesive itself would be held together with strong bonds. Thus the break strength of each adhesive molecule would be the force required to break a strong bond: of the order of one nanoNewton, which is estimated by dividing one electron volt by an extension of one angstrom. For a material with many strongly bound molecules in parallel, the microscopic tensile strength is expected to be of the order of several gigapascals. This is the order of magnitude for the breaking force of strong polymers such as Kevlar [Al-Hassani, S. T. et al, Strain rate effects on GRP, KRP and CFRP composite laminates. *Key Eng. Mater.* 141, 427–452 (1998); Greenwood, J. H. et al, Compressive behavior of Kevlar 49 fibres and composites. *J. Mater. Sci.* 9, 1809–1814 (1974)]. The fracture toughness of such materials is rather small, however, even though the forces are large. This can be understood by considering the area under the force vs. extension curve shown in FIG. 1, which is the energy required to break the material. Because those stiff materials have a small elastic strain, the extension over which the force must be exerted until it breaks is small. Therefore, the area under the curve, or the energy required to break the material, is small.

In contrast to this behavior, the idealized curve for an elastic fiber made of long molecules shows that the force increases slowly as the elastic material is stretched to the point at which the elastic limit is reached, as also illustrated in FIG. 1. [Lu, H. et al, Unfolding of titin immunoglobulin domains by steered molecular dynamics simulation. *Biophysics, J.* 75, 662–671 (1988); Slater, G. W. et al, Construction of approximate entropic forces for finitely extensible nonlinear elastic (FENE) polymers. *Macromol. Theory Simulat.* 3, 695–704 (1994).] Then the force increases rapidly for further extension until it breaks. As with stiff adhesives, this break will also occur at a force of the order of one nanoNewton per molecular chain, assuming each chain is bound to each surface with a strong bond and is itself held together by strong bonds. Contrary to the case of short, inelastic molecules, the pulling force must be applied over much larger extensions. Therefore, the area under the force vs. extension curve would be larger, as shown in FIG. 1, and thus more energy would be needed to break the material. Unfortunately, the technology does not at present exist for making such an idealized elastic material. Real elastic materials such as rubbers have tensile strengths that correspond to breaking forces per molecule of the order of 0.1% of the theoretical maximum.

Natural materials are renowned for strength and toughness not possessed by man made materials. [Qin, X., Coyne et al, A novel natural copolymer: A collagenous molecule from mussel byssus contains silk fibroin-like domains. *Am. Zool* 37, 125A (1997)] Spider dragline silk has a breakage energy per unit weight two orders of magnitude greater than high tensile steel. [Hinman, M. et a, in *Biomedical Materials* (eds Viney, C. et al 25–34 (Materials Research Soc., Pittsburgh, 1993); Heslot, H. Artificial fibrous proteins: A review. *Biochimie* (Paris) 80, 19–31) (1998)] and is representative of many other strong natural fibers. [Waite,J. H. et a, The peculiar collagens of mussel byssus. *Matrix Biol.* 17, 93–106 (19998); Vollrath, F. et al, Modulation of the mechanical properties of spider silk by coating with water. *Nature* 340, 305–307 (1989); Qin, X. X. et al, Tough tendons, Mussel byssus has collagen with silk-like domains. *J. Biol. Chem.* 272, 32623–32627 (1997)]

Titin, the giant sarcomeric protein of striated muscle, is capable of massive length gains, allowing the muscle to be overstretched without irreversible damage to the sarcomere. Rief et al used a single-molecule atomic force microscope to repeatedly stretch individual titin molecules to elongate them. [Rief, M. et al, Reversible unfolding of individual titin immuno-globulin domains by AFM. *Science*, 276, 1109–1112 (1997)] Rief et at found that for larger extensions, the force vs. extension curves typically exhibited a sawtooth-like discontinuity which they hypothesized might reflect the successive unraveling of individual domains of a single titin molecule, unfolding one domain at a time.

The abalone shell, a composite of calcium carbonate plates sandwiched between organic material, is 3000 times more fracture resistant than a single crystal of the pure mineral. [Currey, J. D. Mechanical properties of mother of pearl in tension. *Proc. R. Soc. Lond. B* 196, 443–463 (1997); Jackson, A. P. et al, The mechanical design of nacre. *Proc. R. Soc. Lond. B* 415–440 (1988)] The organic component, comprising just a few percent of the composite by weight [Watable, N. et al (eds.) *The Mechanisms of Bimineralization in Invertebrates and Plants* (Univ. South Carolina Press, Columbia, SC., 1976)], is thought to hold the key to nacre's fracture toughness. [Weiner, S. Organization of extracellularly mineralized tissues: a comparative study of biological crystal growth. *CRC Crit. Rev. Biochem.* 20, 365–408 (1986); Jackson, A. P. et al, A physical model of nacre. *Composites Sci. Technol.* 36, 255–266 (1989)]

Nacre is the scientific name given the "mother of pearl" on the inside of the abalone shell. A matrix protein, named Lustrin A, from the nacreous layer of the shell and pearl produced by the abalone, *Haliotis rufescens*, was cloned and its cDNA coding characterized. [Shen, X. et al, Molecular cloning and characterization of Lustrin A, a matrix protein from shell and pearl nacre of *Haliotis rufescens. J. BioL Chem.* 272, 32472–32481 (1997)] This protein is found between the mineral plates in the abalone shell and participates in holding these plates together. The complete amino acid sequence of Lustrin A was reported by Shen et al, revealing a shell matrix protein with a repeating modular structure. A schematic representation of the modular structure as elucidated by Shen et al is shown in FIG. 2 where cysteine-rich modules (C1–C9) and proline-rich modules (P1–P8) are arranged in tandem and repeated nine and eight times, respectively, in the N-terminal two-thirds of Lustrin A.

The reason for nacre's fracture resistance does not appear to be simply its lamination with an organic material, but the modular nature of the organic material. Ceramics laminated with organic material are more fracture resistant than non-laminated ceramics [Jackson, A. P. et al, supra; Clegg, W. J. et al, A simple way to make tough ceramics. *Nature* 347, 455–457 (1990)], but synthetic materials made of interlocking ceramic tablets bound by a few weight per cent of ordinary adhesives do not have a toughness comparable to nacre. [Almqvist, N. et al, Methods for fabricating and characterizing a new generation of biomimetric materials. *Mater. Sci. Eng.* C 7(1), 37–43 (1999)]

SUMMARY OF THE INVENTION

The present invention provides a material having the advantages of both short molecule fibers or adhesives and long molecule fibers or adhesives, without their individual drawbacks. The material displays a force vs. extension curve that rises to a large force quickly, but then dissipates energy to maintain that force over large extensions. The material is a modular, energy-dissipating material, the modules serving a protective role to prevent catastrophic failure of the material. The modules comprise folded subunits or domains, each domain intraconnected by sacrificial bonds that unfold to dissipate energy in a stepped fashion at forces below that necessary to break the backbone of the material and, with adhesive material, below that necessary to break the bonds that fasten the material to surfaces being glued. Modular adhesives of this invention also serve to give more rigidity than conventional elastic adhesives because for the same length backbone, the modular adhesive molecule is effectively much shorter because most of its length is folded into compact modules.

The invention encompasses the use of modular energy-dissipating material, including that recovered from natural sources, as adhesives materials. It can be used to bond opposing surfaces together, by applying it to the opposing surfaces while the domains are unfolded, and then causing the domains to fold to pull the surfaces together. In particular embodiments, the opposing surfaces can have different bonding characteristics, the polymer structure of said modular material being linear and wherein its opposite ends selectively bond to the different surfaces.

The invention also encompasses the use of modular energy-dissipating material, including that recovered from natural sources, as fibers and in composites, and in a wide variety of other non-adhesive uses, for example as reinforcements, such as for tires and sports equipment, as armor and as elastomeric sealants for repairs.

BRIEF DESCRIPTION OF THE DRAWINGS

FIG. 6 is a plot of an idealized force vs. extension curve for a modular, energy-dissipating material of this invention superimposed on the force vs. extension curve of FIG. 1;

DETAILED DESCRIPTION OF THE INVENTION

The present invention results in part from our fundamental discoveries about the molecular mechanistic origin of the toughness of the nacre in abalone shells, but has application to modular energy-dissipating materials in general, including adhesives, fibers, composites, and other structures that would benefit from such properties. Previous work by others on the insoluble organic matrix from the abalone shell revealed a fibrous core in the interlamellar sheets between successive nacre tablets [Jackson, A. P. et al, supra; Addadi, L. et al, Biomineralization—A pavement of pearl. *Nature* 389, 912–915 (1997); Schaeffer, T. E. et al, Does abalone nacre form by heteroepitaxial nucleation or by growth through mineral bridges? *Chem. Mater.* 9,1731–1740 (1997)], which probably serves as an adhesive holding the tablets together. The organic adhesive is readily apparent when the tablets are pulled apart. Shen, X. et al, supra, the disclosure of which is incorporated herein by reference, isolated the protein Lustrin A from this insoluble organic matrix. The complementary DNA and translated amino acid protein sequence reveal that the structure of this protein consists of 9 and 8, respectively, highly conserved cysteine-rich and proline-rich domains, demonstrating that the structure is highly modular. Immunohistochemical analysis of the fibers revealed Lustrin A to be a component of the adhesive between the nacre tablets.

Rief et al, supra, the disclosure of which is incorporated herein by reference, demonstrated that the modular structure of a single molecule, titin, can be examined by attaching the molecule between a flat surface and a cantilever of an atomic force microscope. By pulling on the protein titin and plotting the force versus extension curves, Rief et al measured the force required to break open the individual subunit in its modular structure. As the titin molecule was stretched, the force vs. extension curve revealed a sawtooth pattern. Using titin constructs, Rief et al demonstrated that every peak in the sawtooth pattern corresponded to a single domain unfolding.

Figure 3:
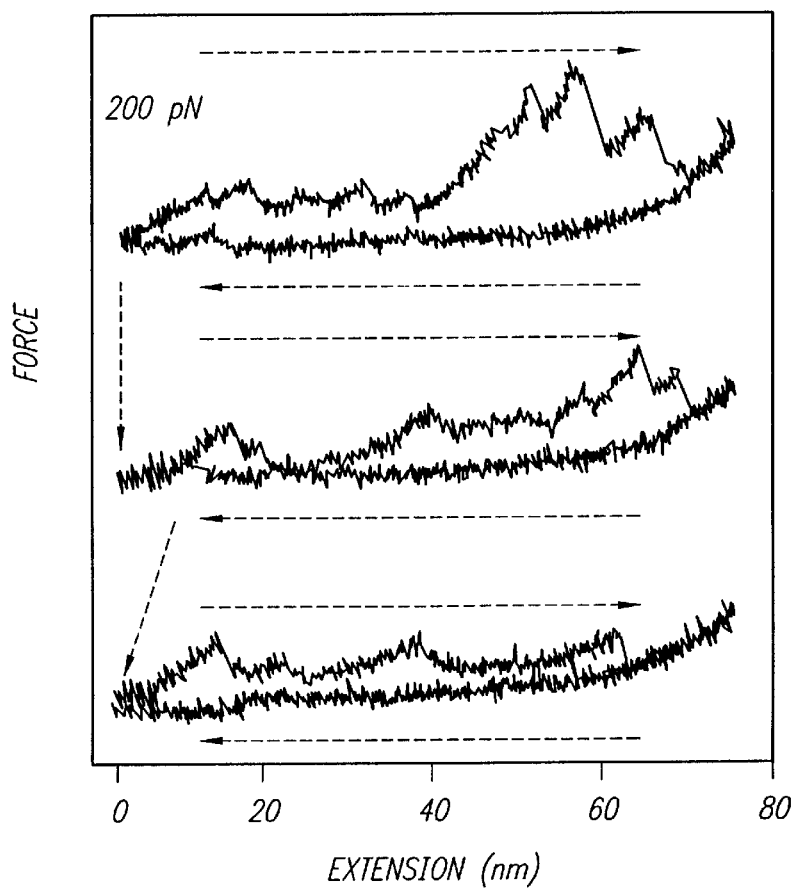
FIG. 3 is a plot of force vs. extension curves for the organic material exposed on a freshly cleaved nacre surface.
Figure 4:
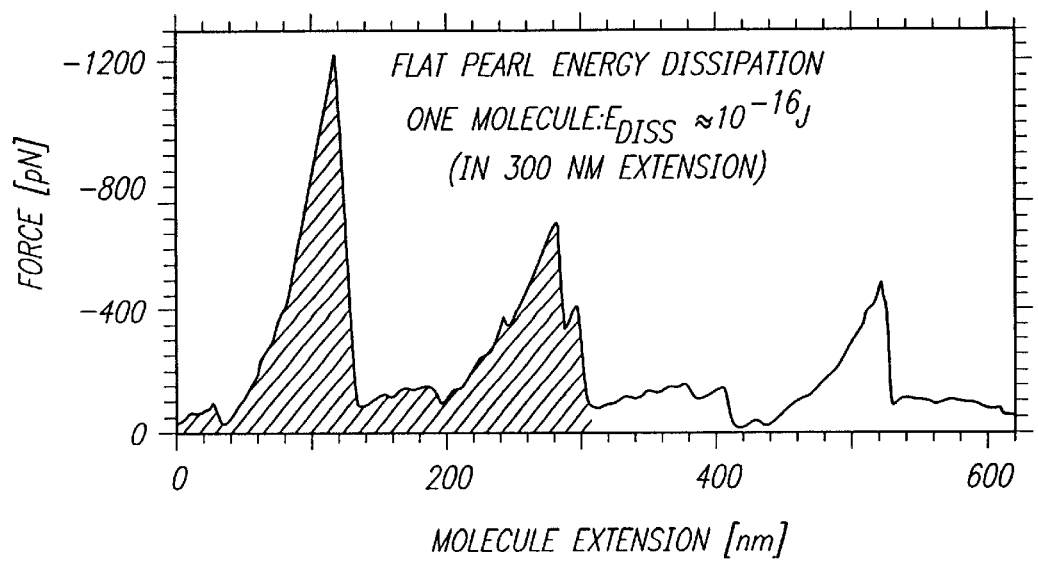

We used this technique to investigate the molecules that hold abalone shells together. FIG. 3 shows force vs. extension curves for the organic material exposed on a freshly cleaved nacre surface. Breaking forces of the order of 100–400 pN are seen in these curves. The surface was not touched between pulls The hysteresis observed after a complete pulling cycle demonstrates that work has been done on the shell. This work is irreversibly dissipated as heat, and the area between the retracting and the approaching parts of the curve quantifies this heat. In this case, the dissipated heat is in the order of $(0.4-1) \times 10^{-17}$ J per cycle. The sawtooth-like force vs. extension curves, and the observation that we could repeatedly unfold molecule(s) without touching the surface between pulls, suggested to us that bonds of some kind are breaking and reforming. As Lustrin A is present on that surface, it is possible that we observed unfolding of this protein. However, and significantly, the mechanism for the strength and toughness of the adhesive is revealed by the force vs. extension curves and does not depend on the identification of the specific molecules involved. As shown in FIG. 4, we had obtained a force vs. extension curve also exhibiting a sawtooth-like pattern from a "flat pearl" of nacre. This was made by placing a cover glass into a living abalone which covered it with a layer of nacre thus making the "flat pearl."

We propose that this sawtooth-like behavior reflects the successive opening of folded domains within a single molecule. As used herein, the term "folded" as applied to modular domains includes folds and tangles as such as well as intra-chain loops, intermolecule coupling, and inter-chain bonds holding a crosslinked multichain matrix together. The forces holding the folds, tangles and intra-chain loops, intermolecule coupling, and the inter-chain bonds, are energy-dissipating and can all be referred to as sacrificial bonds. The term "breaking" as applied to "folded" domains includes unfolding, breaking of bonds, unlinking, and inter-molecule decoupling.

Figure 2:
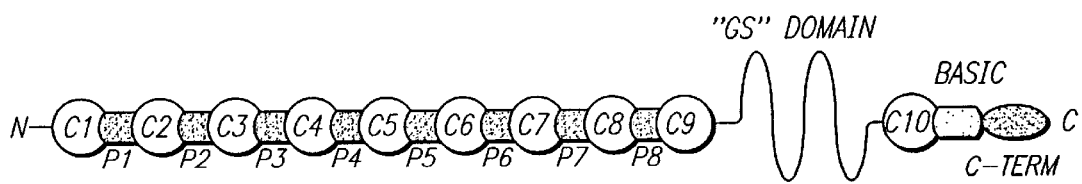
FIG. 2 is a schematic representation of the modular structure of Lustrin A.
Figure 5A:
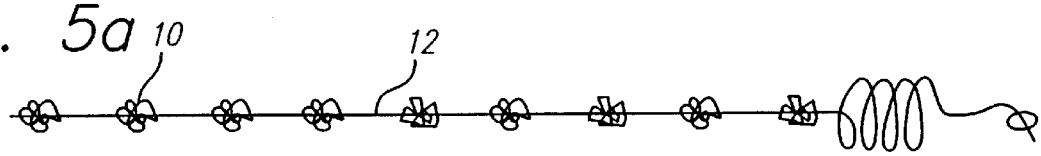
FIG. 5 is a schematic representation of the modular structure of Lustrin A showing a stepped untangling or unfolding of individual domains in the peptide chain.
Figure 5B:
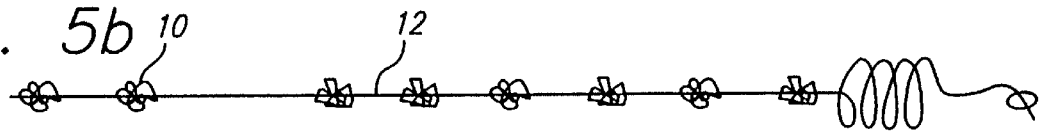
Figure 5C:
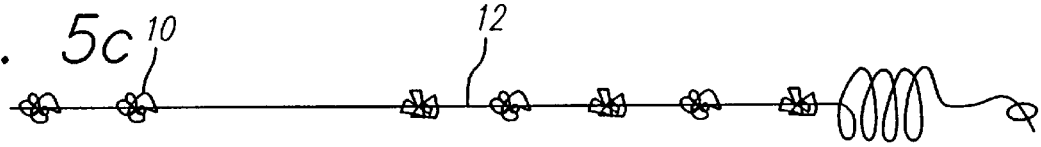

As a result of this investigation we propose a mechanism for the energy dissipating properties of Lustrin A. Referring to FIG. 5(a), the individual domains that Shen et al described, and which are illustrated schematically in FIG. 2, are represented as tangles or folds 10 in the peptide chain 12. In the molecule, these tangles would be protein domains consisting of a polypeptide chain bound together by hydrogen bonding, the hydrophobic interaction, and other bonding mechanisms, probably including disulfide bonds. In FIG. 5, a model for the extension of the protein is shown that explains the sawtooth in the force vs. extension curve of FIG. 3. As proposed by Rief et al for titin, each tooth of the sawtooth is the result of unfolding one domain. As a force is applied to the Lustrin A it reaches a level where it untangles the tangles or folds 10, extending the length of the peptide chain 12, shown stepping progressively from FIGS. 5(a) to 5(c). Although FIG. 5 illustrates the successive disentanglement of adjacent domains, actual disentanglement can occur randomly at different places along the peptide chain.

Figure 1:
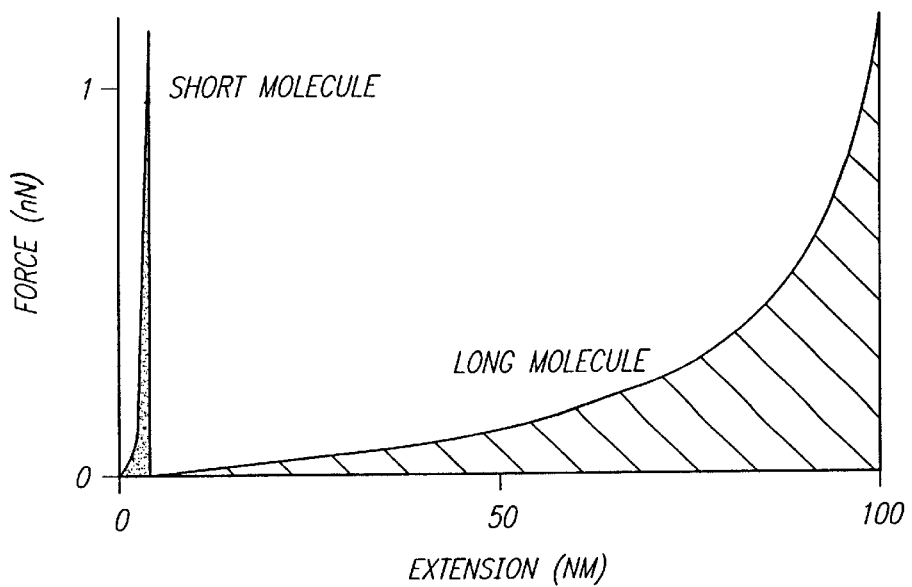
FIG. 1 is a plot of idealized force vs. extension curves for a short molecule and. for a long molecule.
Figure 6:
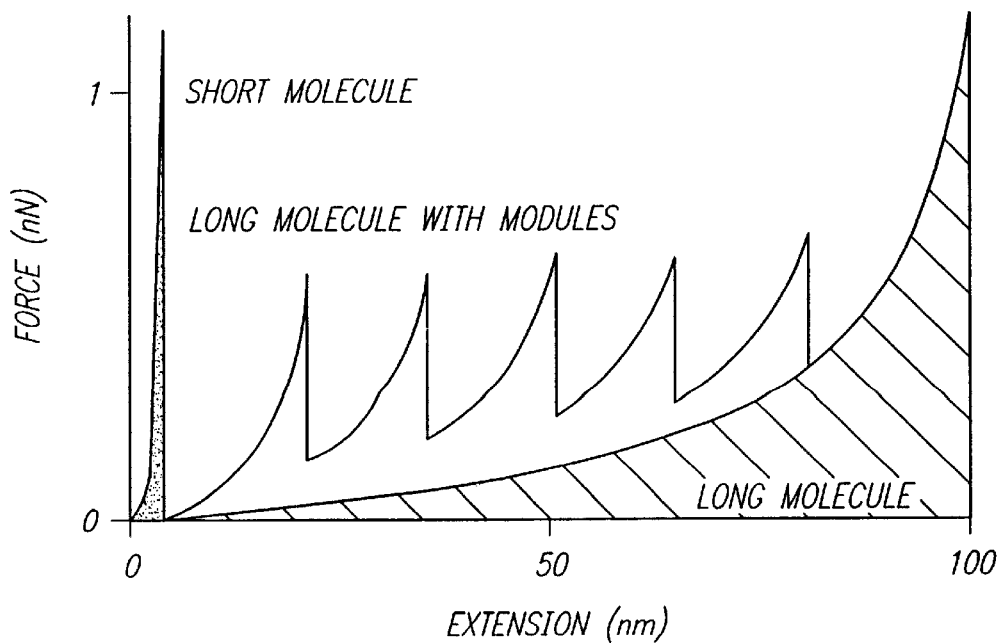
FIG. 6 shows a force vs. extension curve measured on a "flat pearl"

Our invention encompasses the use of modular energy-dissipating material, including synthesized modular, energy-dissipating materials as well as modular, energy-dissipating materials recovered from natural sources. FIG. 6 is a plot of an idealized force vs. extension curve for a modular, energy-dissipating adhesive material of this invention superimposed on the force vs. extension curve of FIG. 1. As discussed in connection with conventional adhesives, in the idealized curve for a rigid adhesive, designated in FIG. 6 as a "short molecule," the force to extend the adhesive increases rapidly—which is almost by definition what is meant by rigid. If the material were theoretically perfect, it would be bound to each surface being glued by a strong bond and the molecules of the adhesive itself would be held together with strong bonds. Thus the rupture strength of each molecule of the adhesive would be the force to break a strong bond: on the order of a nanoNewton as shown in FIG. 6. This would also be the curve for a strong polymer such as Kelvar if it could be bound to each surface by a strong bond.

In the idealized curve for an elastic adhesive, the force increases slowly as the elastic material is stretched until the elastic limit is reached. Then the force increases rapidly for further extensions. If we again assume a perfect elastic adhesive that is bound to each surface with a strong bond and is itself held together by strong bonds, then the rupture force per molecule will again be on the order of a nanoNewton as shown in FIG. 6.

In significant contrast, in the idealized curve for a modular, energy-dissipating adhesive, the force to extend the molecules rises at an intermediate rate. In general, this is the elastic curve for the molecule with all domains still folded. As shown in FIG. 6, this curve rises to a force that is a significant fraction of the force to break a strong bond but, importantly, before a strong bond is broken, a domain unfolds. The force then again rises to a significant fraction of the force to break a strong bond, but again, before a strong bond is broken, a domain unfolds. The process repeats until all domains are unfolded and finally a strong bond breaks as for the conventional adhesives. The net result is to give a relatively large area under the force vs. extension curve. This area is the energy per molecule of adhesive necessary to pull the surfaces apart. By compacting a long molecule into domains that are held together with intermediate-strength bonds, one obtains both high tensile strength and high toughness. Short linkers between the domains will result in a relatively tough and strong polymer. Longer linkers between the domains gives a softer polymer with a smaller restoring force as it is stretched.

In carrying out this invention, it is not necessary to have all the compact modules the same. The force vs. extension curve can be modified to suit some desired purpose such as yielding easily at first and then becoming more and more rigid by using domains that unravel at various forces. Referring again to FIG. 7, the depth of the teeth in the sawtooth can be modified by the size of the individual modules: the spacing of the teeth is the difference between the extended and compact form of each domain. further, it is not necessary for each domain to fully unfold in one step. Multiple steps will further smooth the force vs. extension curve. Additionally, the material can include intermolecular couplings that also break in a stepped fashion upon the application of a force sufficient to break the intermediate couplings but below the force that will break the backbone of the molecule or cause separation from a substrate to which it is bound.

A desirable property of a modular adhesive for many applications is the ability of the domains to refold into the compact domains when the force is reduced. For example, when the force from an impact is over, the structure can recover from the impact as long as the strong bonds are not broken for a significant fraction of the adhesive's molecules.

Another desirable property for many adhesive applications is the ability to apply the adhesive with the domains either folded or unfolded. As illustrated in FIG. 7, the adhesive can be applied to the surfaces to be bound together while the domain-structure of the molecules is still unfolded.

Figure 7A:
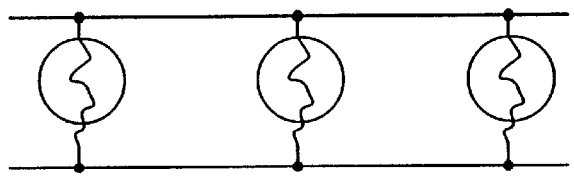
FIG. 7 is a diagrammatic representation of the application of a modular, energy-dissipating material of this invention to surfaces while unfolded, following by folding.
Figure 7B:
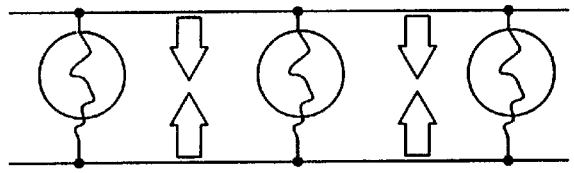
Figure 7C:

The ends of the molecules will now build strong bonds to both of these surfaces (FIG. 7(a)). After that, the folding of the domain-structure will be initiated by an environmental change, e.g. replacing a polar solvent by a nonpolar solvent to fold the hydrophilic domains, by removing or modifying side groups with radiation such as ultraviolet or X—radiation, or by drying or curing (FIG. 7(b)). Alternatively, the domains could fold with time or with the addition of a reagent. As the domains fold, the molecules decrease in length and will therefore pull both surfaces together (FIG. 7(c)).

Figure 8A:
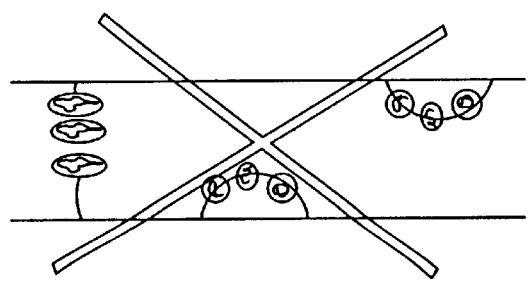
FIG. 8 is a diagrammatic representation of the application of a modular, energy-dissipating material of this invention oriented to particular surfaces.
Figure 8B:
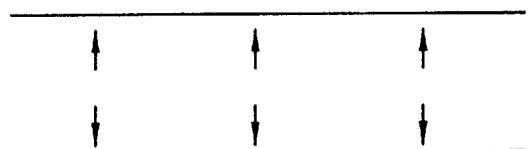
Figure 8C:
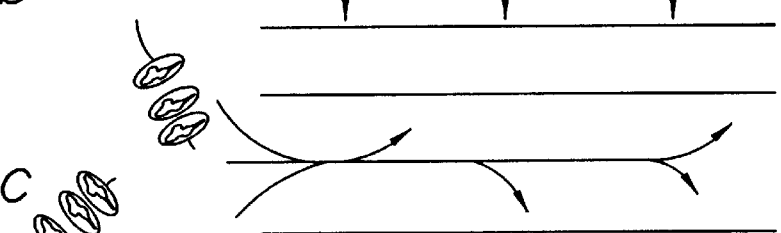
Figure 8D:
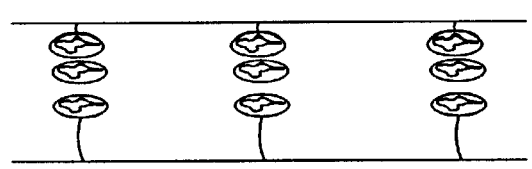

Referring to FIG. 8, an effect that could decrease the strength of an adhesive based on molecules that bound directly to the surfaces is the possibility that both ends of a molecule bond to the same surface and therefore do not contribute to the net strength of the adhesive bond (FIG. 8(a)). This can be minimized by coating each surfaces with a different layer of a specific, strongly bonding molecules (FIG. 8(b)). The two ends of the modular adhesive will also be different; each will specifically bond to the molecules that coat one of the surfaces (FIG. 8(c)). Because the coating molecules are different for each side, the molecules of the modular adhesive will orient from one surface to the other, thus minimizing the number of adhesive molecules that do not contribute to the strength of the adhesive bond. Many examples of suitable specific, strongly binding pairs are known. Examples include Biotin—Avedin, receptor—ligand, carboxylic acid—alumina.

Figure 9:
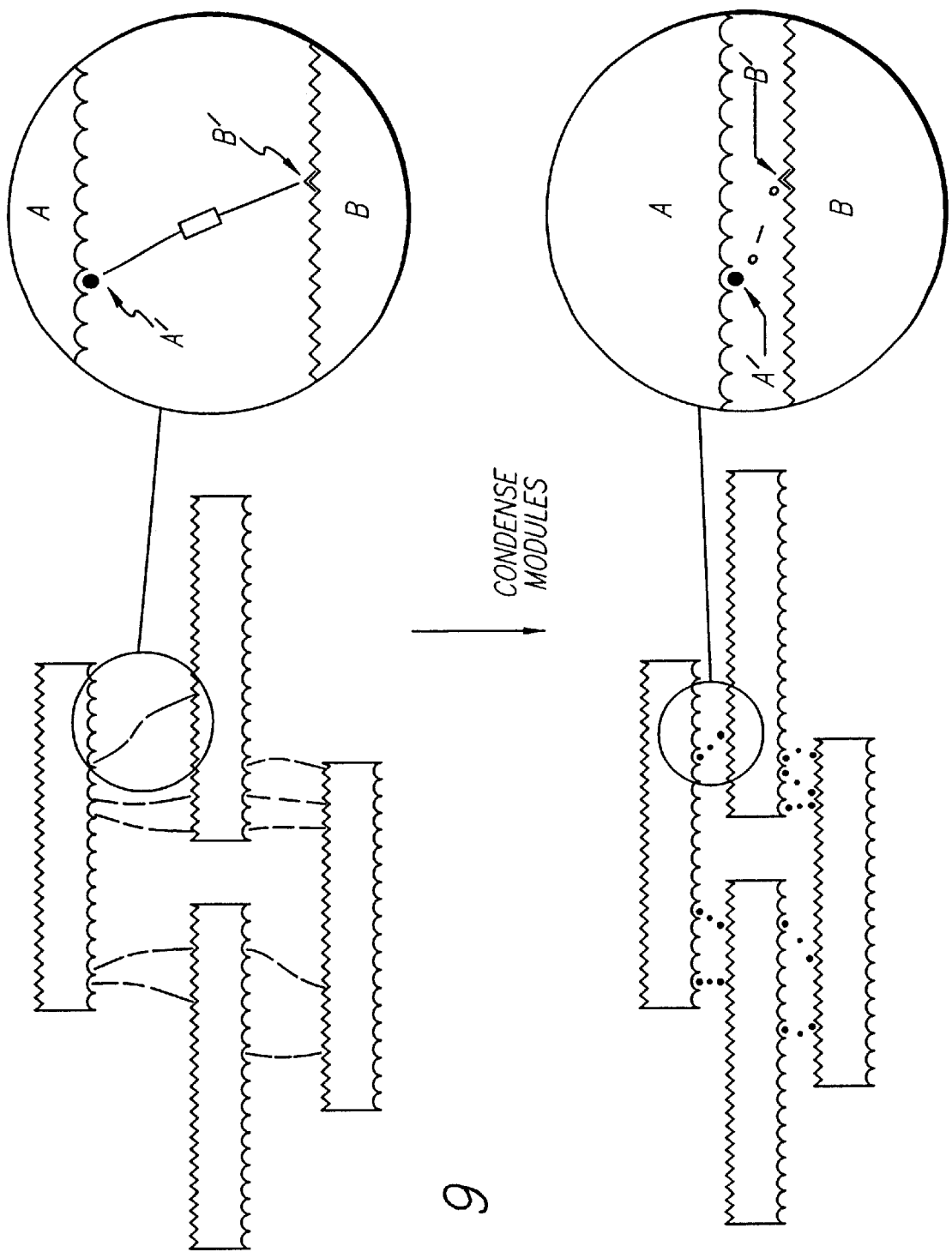
FIG. 9 depicts the self assembly of a modular, energy-dissipating material of this invention.

Referring to FIG. 9, the concepts referred to with respect to FIGS. 7 and 8 can be combined to provide modular adhesives that self-assemble. The specific, strongly bonding pairs are labeled A–A' and B–B'. After the adhesive molecules bind to the surfaces, domain folding is initiated. An advantage of this procedure is that adhesive molecules can flow into a bulk material composed of a large number of pieces and bind to the pieces while there is still space for flow between the pieces. Compaction by domain folding then creates a strong material with smaller distances between the pieces.

For example, in the abalone shell, containing the modular adhesive Lustrin A, the mineral plates of calcium carbonate in the nacre are separated by only a few nanometers-much less than the length of fully extended Lustrin A, which is hundreds of nanometers. Since the dimensions of the plates in abalone nacre are on the order of 5 micrometers across and 300 nanometers thick, in a cubic centimeter of nacre there are on the order of $1/5 = \times 10^{-4} \times 5 \times 10^{-4} \times 300 \times 10^{-7} = 1.3 \times 10^{11}$ plates, over one hundred billion plates. If it were desired to synthesize a similar material in a batch process, rather than one layer of plates at a time, it would be difficult if not impossible to get the adhesive into the narrow spaces present in the natural material. If, however, the scheme shown in FIGS. 7 or 9 were used, the adhesive could flow into larger spaces and then be compacted.

One problem with bulk assembly as above described is removing the solvent as compaction proceeds. The problem could be ameliorated by having compaction proceed uniformly or more rapidly in the interior of the material, induced, for example by radiation, heat or reagents that are injected, activated or uncaged near the center of the material. This would help avoid the problem of trapping solvent by a compacted surface layer. more macroscopic surfaces, the velocity of liquid flow between the surfaces being pulled together by the adhesive molecules can become an issue. Assuming circular surfaces with radius r, final distance d, and approach velocity $\bar{d}$, the fluid velocity at the surface periphery would be $v = r\bar{d}/2d$. For radii on the order of cm and approach velocities on the order of nm/s we expect liquid viscosity to set the maximum possible approach speed.

The modular, energy dissipating material of this invention can be used as adhesives, as fibers and in a wide variety of other non-adhesive uses, for example as reinforcements, such as for tires and sports equipment, as armor and as elastomeric sealants for repairs. The material can be used to form a composite having modular, energy-dissipating properties by mixing together a modular, energy-dissipating material and an aggregate to form a slurry, and drying the mixture to obtain a composite having modular, energy dissipating properties. The modular, energy-dissipating material can be harvested Lustrin A or can be a synthesized polymer.

There are many ways of achieving a modular, energy-dissipating material of this invention, which given the above description explanation will immediately be apparent to those skilled in the chemical and polymer arts. For example, it is known that titin domains are held together with about 6 hydrogen bonds between the polypeptide chains, possibly like those in a beta sheet. One key aspect is that the strands are arranged so that each of the bonding strands has the same C to N terminus direction so that all 6 or so bonds must be broken at once for the domain to unfold. In this arrangement the bonds cannot be "unzipped", by breaking one bond at a time. This structure could also be used in a synthetic material. The number of hydrogen, van der Waals or other weak bonds can be varied from the 6 or so in titin to obtain the desired binding for the subunit that yields at a force below the magnitude that would break the backbone. To be specific for titin, the 6 or so hydrogen bonds break at a total force of order 200–400 pN at physiologically relevant pulling rates, in comparison to the force of order 1000 pN to break the backbone. The invention is further illustrated by the following examples.

EXAMPLE 1

A block copolymer adhesive can be readily synthesized consisting of blocks that unravel or unfold at forces below those necessary to break the bonds that fasten the adhesive to the surfaces being glued and below the breaking strength of the backbone of the adhesive molecule. One can use any amphiphilic block copolymer having substantial hydrophilic and hydrophobic components, and vary their proportions as desired. For example, one can use a block copolymer in which a hydrophilic poly(alkylene oxide) such as poly (ethylene oxide ($EO_x$) is linearly covalent with, and alternates with, the opposite ends of a hydrophobic poly(alkylene oxide) such as polypropylene) oxide ($PO_y$) or a block copolymer in which, for example, poly(ethylene oxide) is linearly covalent with poly(butylene oxide) ($BO_y$). This can variously be designated as follows:

(poly(ethylene oxide)-poly(propylene oxide)-poly (polyethylene oxide))$_z$ (PEO-PPO-PEO)$_z$ HO((CH$_2$CH$_2$O)$_x$(CH$_2$CH(CH$_3$)O)$^y$(CH$_2$CH$_2$O)$_x$)$_z$H (EO$_x$ PO$_y$ EO$_x$)$_z$ or (poly(ethylene oxide)-poly(butylene oxide)-poly (polyethylene oxide))$_z$ (PEO-PBO-PEO)$_z$ HO((CH$_2$CH$_2$O)$_x$(CH$_2$CH(CH$_3$CH$_2$)O)$_y$)$_z$H (EO$_x$ BO$_y$ EO$_x$)$_z$ where x is 1 to 10 or greater, y is 10 to 100 or greater, and z is 10 to 20 or greater, with no theoretical upper limit to these values subject to practical considerations of ease of synthesis and desired properties. Specifically, the shorter are the linkers between the unfoldable modules, the tougher and stronger will be the polymer. Longer linkers between the domains gives a softer polymer because of a smaller restoring force as it is stretched. Alternatively, for particular applications, one can use a reverse block copolymer or a star block amphiphilic poly(alkylene oxide block copolymer, for example, a star di-block copolymer or a reversed star di-block copolymer. A specific examples is $(EO_x BO_y EO_x)_z$ where x, y, and z are in the same ranges as above. In general, for the polymer to be used in an aqueous environment, we want the hydrophobic domains, which will fold, to be long, e.g., on the order of 100 subunits of the hydrophobic monomer and, for a strong, tough polymer, the hydrophilic domains to be as short as possible, consistent with steric considerations, e.g., 5 subunits, or even as low as 1 subunit; for a strong, tough polymer and longer, of on the order of 10 to 100 subunits, for a softer polymer. Conversely, for a polymer to be used in a non-aqueous environment such as in an oil or other hydrophobic liquid, then we want the hydrophilic domains, which will fold, to be longer and the hydrophobic domains to be short for a strong, tough polymer and longer for a softer polymer.

The amphiphilic block copolymer can be formed with folded domains by immersing the polymer in either an aqueous or nonpolar liquid medium, depending on the prevalence, respectively, of hydrophobic or hydrophilic components, then drying. Alternatively, when used to closely secure opposing surfaces, one could separate the surfaces and apply the block polymer adhesive in a compatible liquid medium, then substitute the incompatible medium. For example, one could apply a predominantly hydrophillic, but amphiphilic block copolymer in an aqueous liquid medium, such as water, then substitute a nonpolar liquid medium, such as hexane, to cause the polymer to fold and draw the surfaces closely together.

The following are specific examples of $EO_x PO_y EO_x$ triblocks that can be used in $(EO_x PO_y EOX)_z$ where z is 20 to prepare amphiphilic block polymers that fold in an aqueous liquid media:

Mavg=4400 x=5 and y=70
Mavg=5800 x=20 and y=70
Mavg=12800 x=106 and y=70

Example 2

Example 1 can be followed with $(PO_x EO_y PO_x)_z$ where z is 20 and for the $PO_x EO_y PO_x$ component, Mavg=3600 x=33 and y=19, for folding in a nonpolar environment.

EXAMPLE 3

Figure 10:
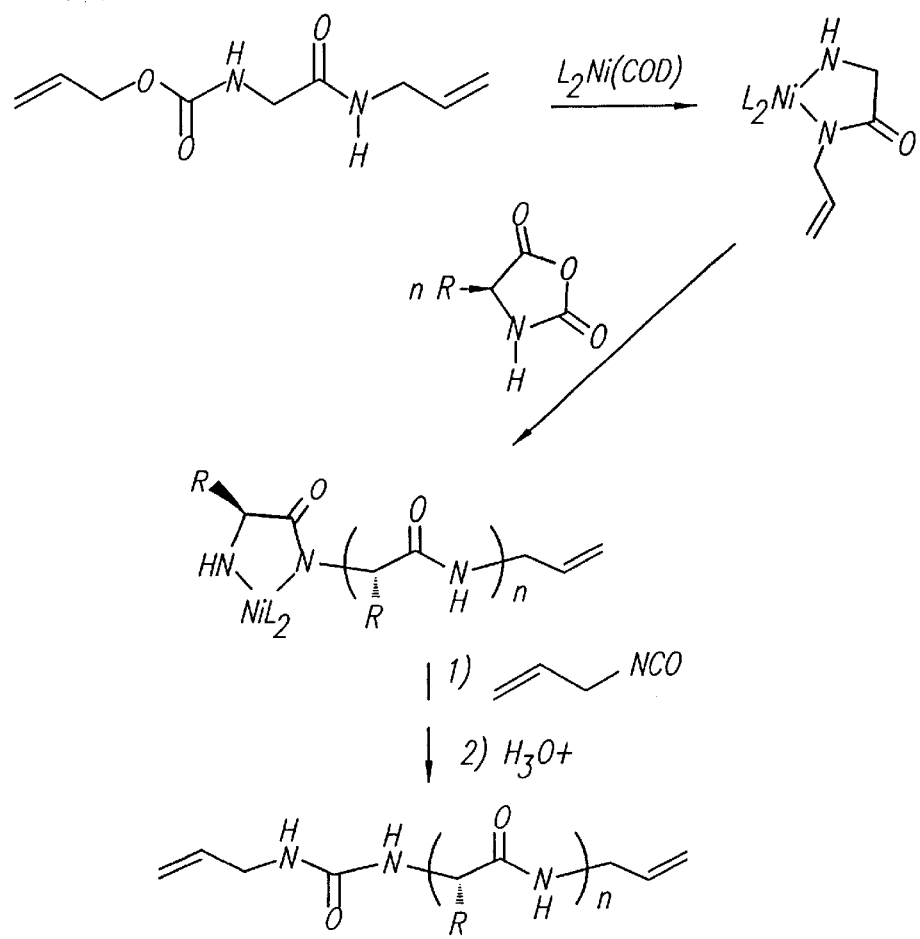
FIG. 10 depicts the reaction scheme for the synthesis of a difunctional polypeptide, in accordance With a particular embodiment of the invention.

Linear, elastomeric fibers can be prepared with polypeptide domains. Referring to FIG. 10, an allocaminoacid amide, where the amide contains a terminal alkene functional group (e.g. allyl), can be reacted with bis(1,5-cyclooctadiene) nickel and a chelating bisalkylphosphine (e.g. bis(diethylphosphino)ethane) to generate a nickelamido-amidate initiator complex. To this complex can be added an amino acid-N-carboxyanhydride monomer (e.g. gamma-benzyl-L-glutamate-N-carboxyanhydride) in sufficient quantity (e.g. 100 equivalents) to form a polypeptide with an alkene end group on the C-terminus. To this activated polymer can be added excess alkene-substituted isocyanate (e.g. allyl isocyanate) to end-cap the N-terminus with an alkene functional group.

Figure 11:
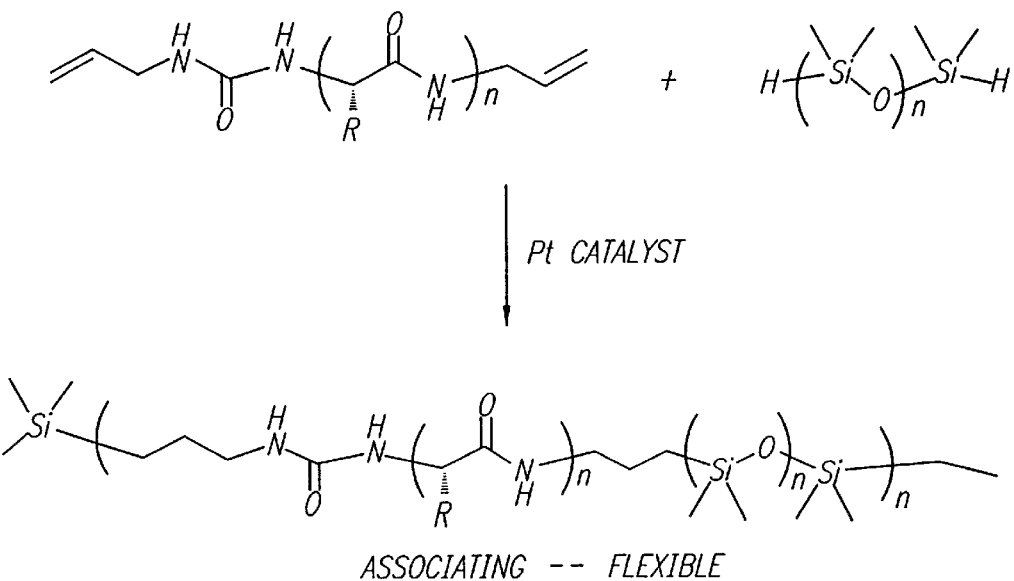
FIG. 11 depicts the reaction scheme for the synthesis of multiblock polymers from the polypeptide of FIG. 10.

Referring to FIG. 11, this alpha, omega-alkene functionalized polypeptide (e.g. Mol wt=20,000 Da) can then be reacted with commercially available alpha, omega-silane terminated poly(dimethylsiloxane) (e.g. Mol. wt 1,000 DA for a strong and rigid polymer to 20,000 Da for a softer polymer) and coupled using a platinum catalyst (platinum (0)-1,3-divinyl-1,1,3,3-tetramethyidisiloxane complex) to give a multiblock copolymer containing alternating domains of polypeptide and polydimethylsiloxane (Mol wt of approx. 100 kDa–500 kDa).

The different domains (and sizes) of the block copolymers (polypeptide and conventional synthetic material) can be varied widely to drastically change the properties of the end-product materials. For example, incorporation of a large fraction of polypeptide will result in fibrous material. Incorporation of large amounts of a flexible polymer, such as PMDS, would give an elastomeric material. Incorporation of different functionality (e.g. dihydroxyphenylalanine) into the polypeptide domain would result in an material with adhesive properties.

EXAMPLE 4

A linear elastomeric, modular, energy-dissipating fiber can be obtained by the metallocene catalyzed synthesis of modular, polyolefin-tailed silicone.

EXAMPLE 5

A linear elastomeric, modular, energy-dissipating fiber can be obtained by the extension of functionalized polydimethylsiloxane with an organic polymer by radical-catalyzed polymerization.

EXAMPLE 6

Lustrin A can be harvested using procedures described in Shen X., supra. It can then be applied directly as an adhesive

EXAMPLE 7

The Lustrin A of Example 6 can be mixed with an aggregate; such as sand, to form a slurry. The mixture is then dried by the application of heat from an infrared lamp whereupon the mixture compacts to form a composite having modular, energy-dissipating properties.

We claim:

1. A synthesized modular, energy-dissipating material, comprising a backbone breakable under the application of a force of a first magnitude and formed of a pluralty of folded subunits, said subunits increasing in length by unfolding in a stepped fashion upon the application of a force below said first magnitude, thereby preventing the buildup of force on said backbone to said first magnitude.

2. An energy-dissipating synthesized material comprising a modular polymer structure having multiple folded domains, each domain intraconnected by sacrificial bonds, and having a backbone breakable under the application of a force of a first magnitude, said domains unfolding in a stepped fashion upon the application of a force sufficient to break said sacrificial bonds but below said first magnitude, thereby preventing the buildup of force on said backbone to said first magnitude.

3. The material of claim 2, comprising a linear elastomeric fiber.

4. The material of claim 3, wherein said linear elastomeric fiber is obtained by the metallocene catalyzed synthesis of modular, polyolefin-tailed silicone.

5. The material of claim 3, wherein said linear elastomeric fiber is obtained by the extension of functionalized polydimethylsiloxane with an organic polymer by radical-catalyzed polymerization.

6. The material of claim 2, comprising an elastomeric three dimensional material.

7. The material of claim 3, wherein said three dimensional elastomeric material is an adhesive.

8. The material of claim 2, comprising an amphiphilic block copolymer.

9. The material of claim 8, in which said amphiphilic block copolymer has domains that are foldable in a polar liquid medium.

10. The material of claim 8, in which said amphiphilic block copolymer has domains that are foldable in a nonpolar liquid medium.

11. An adhesive comprising an energy-dissipating material of claim 2 capable of forming fastening bonds with opposing surfaces of objects to be connected, individual domains thereof breaking upon the application of a force thereto of a magnitude sufficient to break said sacrificial bonds but below that necessary to break said fastening bonds.

12. The material of claim 2, wherein said domains are formed whereby to unfold variously on the application of various magnitudes of force.

13. The material of claim 2, wherein each domain is formed to unfold in a stepped fashion.

14. The material of claim 2 formed whereby said domains refold upon reduction of said applied force.

15. The material of claim 2 wherein said material also includes intermolecule couplings.

16. The material of claim 15 wherein said intermolecule couplings also break in a stepped fashion upon the application of a force sufficient to break said intermolecule couplings but below said first magnitude.

* * * * *